_Patented Jan. 2, 1951_ 2,536,347

UNITED STATES PATENT OFFICE 2,536,347

PRODUCTION OF BASIC AMMONIUM URANYL SULFATE AND URANIUM OXIDE

Eugene O. Brimm, Kenmore, and Carleton N. Smith, Snyder, N. Y., assignors, by mesne assignments, to Union Carbide and Carbon Corporation, a corporation of New York No Drawing. Application October 14, 1944, Serial No. 558,726

4 Claims. (Cl. 23—14.5)

This invention relates to the manufacture of oxides of uranium, and pertains more particularly to a method for making uranosic oxide ($U_3O_8$) of a high degree of purity.

Uranosic oxide may be produced by calcining (heating in the air) uranium compounds which contain no nonvolatile impurities, e. g. ammonium diuranate, ammonium uranyl carbonate, uranyl nitrate, uranyl sulfate, uranic acid, or uranium peroxide.

The usual processes for recovering uranium from its ores yield a produce containing from 2% to 10% sodium combined with the uranium as sodium uranate. As this sodium can not be driven off by heat, its removal is a necessary preliminary to the preparation of uranosic oxide by calcination.

One method which has been proposed consists in digesting sodium uranate with a concentrated solution of ammonium chloride, thereby replacing the sodium with an ammonium radical and producing sodium chloride which may be removed by filtration and washing. By repeating the digestion step several times, using fresh portions of ammonium chloride solution, nearly all of the sodium may be extracted and the resulting ammonium uranate may then be calcined to obtain uranosic oxide. The principal shortcoming of this method for large scale use is that it is slow and expensive.

Another method consists in dissolving the sodium uranate in acid and then adding ammonia to precipitate ammonium uranate. This method must likewise be repeated if a pure product is desired.

A third method, described in Patent 1,210,714, Harvey A. Seil, comprises moistening sodium uranate with enough sulfuric acid to combine with the sodium to form sodium sulfate or bisulfate, heating the resulting mixture, and extracting the sodium sulfate with water. This method may be used to remove most of the sodium, but it has a serious disadvantage in that critical control of the time and temperature of heating are necessary. Low temperatures or short times lead to incomplete removal of sodium and loss of uranium on extraction. Too long a time and too high a temperature result in incomplete removal of sodium because of the reaction of sodium sulfate with uranosic oxide to form sodium uranate.

According to this invention, the removal of substantially all alkali metal is accomplished without dissolving any great amount of uranium, by treating (digesting) an aqueous suspension of an alkali-containing uranium compound with acid and an ammonium salt of such acid, while maintaining the pH of such suspension or solution within the range of 4 and 6, preferably 4.5 to 5.

The proportion of ammonium salt is not ordinarily critical, except as explained hereinafter. Good results are obtainable at ammonium salt concentrations corresponding to about 10% by weight of the water present; but this concentration may be varied within wide limits, for example 5% to 15%.

The foregoing treatment may be conducted at room temperature, in which case it should ordinarily be continued for several hours, or at elevated temperatures, e. g. 90° to 95° C., which hasten the reactions.

Upon completion of the reactions, the reaction mixture is filtered, leaving a residue of alkali-free uranium compounds. The residue may be washed with hot water, preferably containing ammonium salt, for instance a 1% solution of the ammonium salt of the acid used in the first, digesting, step. After washing, the residue is dried and then calcined to produce pure uranosic oxide, $U_3O_8$. Suitable calcining temperatures are those within the range 750° to 900° C.

While satisfactory results may be obtained with various acids, such as hydrochloric, nitric, or acetic, superior results are obtainable by the use of sulfuric acid and ammonium sulfate.

One reason for the particularly favorable results of the use of sulfuric acid and ammonium sulfate is that, under the conditions just mentioned, an insoluble basic ammonium uranyl sulfate is formed. This novel compound, the existence of which we have verified by X-ray diffraction methods, has a formula, by analysis, corresponding approximately to

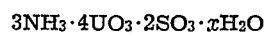

$$3NH_3 \cdot 4UO_3 \cdot 2SO_3 \cdot xH_2O$$

It is an orange-yellow crystalline solid, insoluble in water but soluble in dilute mineral acids. At temperatures above 100° C., the water is removed to an extent dependent upon the temperature. The compound has no melting point, but at high temperatures decomposes with loss of ammonia and, at still higher temperatures loses $SO_3$, yielding uranosic oxide, $U_3O_8$. Decomposition is rapid at 800° C. or above, slower at 600°–700° C.

Other acids, such as nitric, hydrochloric, and acetic, do not form insoluble basic ammonium uranyl compounds, but, rather, mixtures of uranyl salts with hydrated uranic oxide and other known compounds.

Thus, in another aspect, this invention includes, as a new and useful composition of matter, basic ammonium uranyl sulfate, and a novel method of making such compound by reacting upon an acid-soluble oxidic uranic compound, such as sodium uranate, with sulfuric acid and ammonium sulfate.

To form the desired basic ammonium uranyl sulfate, it is of course necessary that enough ammonium sulfate be present in the reaction mixture to satisfy the formula given above of such basic ammonium uranyl sulfate. An excess of ammonium salt is preferred.

In a typical specific application of this invention, a quantity of powdered sodium uranate (6.8% $Na_2O$) corresponding to 2649 pounds of $U_3O_8$ was added to a 10% solution of ammonium sulfate containing 1686 pounds of ammonium sulfate. The resulting aqueous suspension was heated to about 90° to 95° C. and sulfuric acid was added slowly, as the suspension was stirred, until the pH remained constant at 4.4. The product was filtered and the filter cake washed with hot 1% ammonium sulfate solution. The washed cake was dried, then calcined for about an hour at 1000° C. The calcined product contained 99.24% $U_3O_8$ and 0.03% $Na_2O$.

The loss of uranium by solution in the acid and salt solution is very slight, under least favorable conditions being under 1.5% and under best conditions being 0.5% or less. Calcination readily eliminates all of the ammonia and substantially all of the sulfur. Sulfur contents are ordinarily well under 0.1%.

We claim:

1. A method of making basic ammonium uranyl sulfate which comprises mixing an acid soluble oxidic uranium compound with sulfuric acid and ammonium sulfate, and maintaining the pH of the mixture between 4 and 6.

2. A method of making basic ammonium uranyl sulfate which comprises mixing a hot aqueous suspension of sodium uranate with sulfuric acid and ammonium sulfate, and maintaining the pH of mixture between 4.5 and 5.

3. A method of making uranosic oxide which comprises treating a hot aqueous suspension of sodium uranate with sulfuric acid and ammonium sulfate at a pH between 4.5 and 5 to form a water-insoluble basic ammonium uranyl sulfate, filtering off the liquid, and calcining the basic ammonium uranyl sulfate.

4. A method of making uranosic oxide which comprises treating in aqueous medium a uranate with an acid and an ammonium salt of such acid, while maintaining the pH of said medium between 4 and 6, filtering the liquid from the resulting solid, and calcining said solid.

EUGENE O. BRIMM.
CARLETON N. SMITH.

REFERENCES CITED

The following references are of record in the file of this patent:

Mellor, "Inorganic and Theoretical Chemistry," vol. 12, page 108, Longmans, Green and Co., London (1932). (Copy in Div. 59.)

Lowry, "Inorganic Chemistry," page 174, second edition (1931). MacMillan and Co., London. (Copy in Div. 59.)